June 11, 1968   C. M. FARHA   3,387,979
METHOD FOR FLAVORING UNCOOKED POULTRY
Filed May 19, 1965
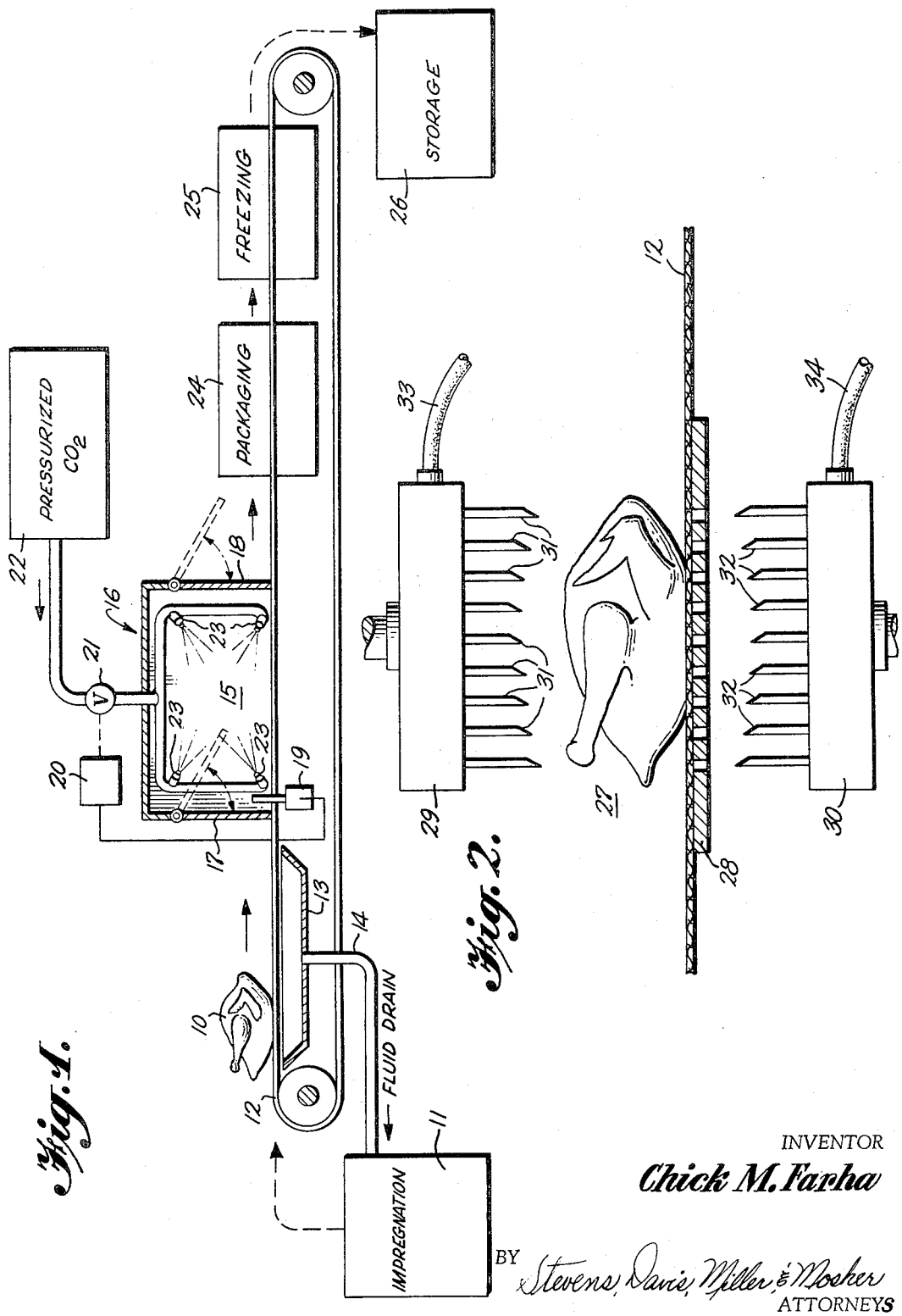
INVENTOR
*Chick M. Farha*
BY *Stevens, Davis, Miller & Mosher*
ATTORNEYS 3,387,979
METHOD FOR FLAVORING UNCOOKED
POULTRY
Chick M. Farha, 2600 Warwick Drive,
Oklahoma City, Okla. 73116
Continuation-in-part of application Ser. No. 420,067,
Dec. 21, 1964. This application May 19, 1965, Ser.
No. 457,001
3 Claims. (Cl. 99—194)

ABSTRACT OF THE DISCLOSURE

A method for flavoring food products, such as meat, poultry and the like, consisting of the steps of impregnating the food product with a flavoring solution, surface freezing the food product to prevent unwanted draining of the flavoring solution, placing the food product in a plastic bag, substantially evacuating the bag, and quick freezing said bagged product.

---

This is a continuation-in-part of application Ser. No. 420,067, filed Dec. 21, 1964, now abandoned.

The present invention relates to a method and apparatus for preparing food products; and more particularly for impregnating said food products with aromatic flavoring.

It is well known that meats which are broiled over a fire of aromatic fuel, such as hickory wood, absorb a certain amount of flavor and aroma from the burning fuel which enhance and supplement the natural flavor of the meat. It is also well known that meats may be preserved and flavored by long exposure in warm smoky atmospheres whereby the products of partial combustion penetrate gradually throughout the meat and thereby affect the desired results. It is further well known that meats may be flavored by keeping them for a period in a marinade.

Applicant has discovered a new method that has made it possible to impart desired flavors to uncooked food products, such as poultry or meats, and preserves them for long periods. The new method improves several of the more desirable characteristics of the above mentioned methods to yield a product which is highly palatable to modern day tastes.

It is therefore an object of the present invention to provide a novel method for imparting flavor superficially to raw food products such as poultry and preserving the food product in its uncooked state.

It is another object of the invention to provide a method for flavoring and preserving food products which may quickly and efficiently be carried out.

The means by which the foregoing objects and advantages, which will be apparent to those skilled in the art, are accomplished as set forth in the following specification and claims, and are illustrated in the accompanying drawings dealing with a basic embodiment of the present invention. Reference is made now to the drawings in which:

FIG. 1 illustrates diagrammatically the preferred embodiment of the invention; and FIG. 2 is a side elevation of an alternate method of impregnating the food product with the flavoring.

Referring now to FIG. 1 a freshly killed and cleaned chicken 10 is placed into a vat 11 containing the desired barbecue solution where it is left to soak for a suitable length of time.

During the development of this invention a barbecue solution which was found to be quite satisfactory consisted of five percent cane and brown sugar, ten percent hydrolized plant proteins, five percent monosodium glutamate, and eighty-five percent condensed liquid smoke. It was further found that soaking a two to three pound chicken in the solution for approximately six hours gave a highly desirable and very tasty end product.

After impregnation with flavoring, the chicken is removed from the vat 11, and placed on a conveyor 12 where, at a first station, the excess liquid filling the cavities of the chicken is allowed to drain off into a receiving pan 13 having a return drain 14 leading to the vat 11. The chicken has substantially all of the excess liquid flavoring drained therefrom before it is conveyed to a second station generally indicated by reference numeral 15.

The second station 15 is a rapid chilling station consisting of a closed chamber 16 having readily movable entrance and exit doors, noted as 17 and 18 respectively. In their normal position, the doors will effectively close off the chamber 16 from the atmosphere. A microswitch 19 is mounted within the chamber 16 adjacent the conveyor 12 where it will be actuated by a chicken arriving within the chamber. Switch 19, when actuated energizes a valve actuating means 20 which in turn actuates an electro valve 21 thereby allowing $CO_2$ gas under pressure to pass from reservoir 22 to chamber 16 through a plurality of nozzles 23. The gas passing through the nozzles will expand rapidly thereby quickly chilling chamber 16. The nozzles are located around the chamber and directed towards the center thereof so that the rapidly expanding gas will strike substantially all the surfaces of the chicken thereby chilling it and solidifying the barbecue solution therein and preferably surface freezing the chicken. This uniformity of locked-in flavor is guaranteed while the chicken is bagged and frozen.

The surface chilling should be completed immediately after the chicken receives the flavoring in order to insure even ingredient distribution throughout the chicken. Otherwise, incomplete draining may result in pockets of flavoring settling within the chicken thus detracting from its palatability. After leaving the second station, the chicken is conveyed to bagging, freezing, and storing stations indicated by blocks 24 to 26 respectively. Substantially all of air is removed from the bag by evacuation prior to final freezing of the chicken.

The food product is now ready to be marketed. The consumer may cook the food product in its frozen state simply by removing the bag and putting it on a rotisserie or other suitable cooking means and cooking at a medium heat, to allow for defrosting, then increasing heat towards the end of the cooking process to thoroughly cook the food product. Of course the food product may be defrosted prior to cooking which would allow the product to be prepared in a much shorter time period.

An alternate method of flavor impregnation is shown in FIG. 2. This method would replace soaking in vat 11. The chicken 10 is moved on a conveyor 12 into a work area 27 which would precede the second station 15. In this work area the chicken will be supported by the perforated plate 28. Above and below the chicken are located presses 29 and 30 each having a plurality of hypodermic type needles 31 and 32 depending therefrom. When the chicken has reached the work position, the presses close so that the needles 31 and 32 penetrate into the chicken. The flavoring solution is then introduced under pressure to the chicken through needles 31 and 32 which are fed from a source (not shown) through conduits 33 and 34. After a suitable amount of flavoring solution is forced into the chicken, the presses are withdrawn withdrawing the needles from the chicken which then passes on to the next station.

The invention may be embodied in other specific forms without departing from the spirit or essential characteristics thereof. The present embodiment is therefore to be considered in all respects as illustrative and not restrictive, the scope of the invention being indicated by the appending claims rather than the foregoing description, and all changes would come within the meaning and range of the equivalency of the claims are therefore to be embodied therein.

What is claimed is:

1. A method for flavoring fresh uncooked poultry consisting of the steps of impregnating said poultry with a flavoring solution, draining excess solution from the cavities within said poultry, rapidly surface freezing said poultry immediately after said draining to thereby solidify the remaining solution in situ to assure flavor uniformity, bagging said food product in a suitable bag, substantially evacuating said bag, and thoroughly freezing said bagged flavored poultry.

2. A method according to claim 1 in which said impregnating comprises soaking said poultry in said flavoring solution.

3. A method according to claim 1 in which said impregnating comprises injecting said flavoring solution into said poultry.

References Cited

UNITED STATES PATENTS

| | | | |
|---|---|---|---|
| 2,825,652 | 3/1958 | Berkowitz | 99—174 X |
| 2,974,047 | 3/1961 | Holmes | 99—159 X |
| 3,207,608 | 9/1965 | Brown et al. | 99—159 X |
| 3,216,826 | 11/1965 | Wattenbarger | 99—107 |
| 3,266,909 | 8/1966 | Ellis | 99—174 X |

HYMAN LORD, *Primary Examiner.*